United States Patent
Abrolat et al.

(10) Patent No.: US 10,670,435 B2
(45) Date of Patent: Jun. 2, 2020

(54) MAGNETIC-INDUCTIVE FLOWMETER AND CORRESPONDING METHOD

(71) Applicant: KROHNE Messtechnik GmbH, Duisburg (DE)

(72) Inventors: Jan Abrolat, Bochum (DE); Thomas Musch, Bochum (DE)

(73) Assignee: KROHNE MESSTECHNIK GMBH, Duisburg (DE)

(*) Notice: Subject to any disclaimer, the term of this patent is extended or adjusted under 35 U.S.C. 154(b) by 206 days.

(21) Appl. No.: 15/443,061

(22) Filed: Feb. 27, 2017

(65) Prior Publication Data
US 2017/0248452 A1  Aug. 31, 2017

(30) Foreign Application Priority Data

Feb. 26, 2016 (DE) .................. 10 2016 103 504
May 31, 2016 (DE) .................. 10 2016 110 059

(51) Int. Cl.
*G01F 1/58* (2006.01)

(52) U.S. Cl.
CPC .................. *G01F 1/588* (2013.01)

(58) Field of Classification Search
CPC .............. A61K 31/4184; C07D 401/04; C08L 2666/26; G01F 1/58; G01F 1/588; G01F 1/584; G01F 1/60; G01F 1/586
USPC ..................................... 73/861.12
See application file for complete search history.

(56) References Cited

U.S. PATENT DOCUMENTS

| 5,448,920 A | 9/1995 | Ketelsen et al. |
| 6,865,956 B2 | 3/2005 | Yamamoto |
| 2004/0060366 A1* | 4/2004 | Yamamoto .............. G01F 1/588 |
| | | 73/861.12 |

(Continued)

FOREIGN PATENT DOCUMENTS

| CN | 201345159 Y | * 11/2009 |
| CN | 201345159 Y | * 11/2009 |
| RU | 2 284 476 C2 | 9/2006 |

OTHER PUBLICATIONS

Taiichi Teshima, Satoshi Honda and Yutaka Tomita; Electromagnetic Flowmeter With Multiple Poles and Electrodes; Proceedings of IEEE Instrumentation Oand Measurement Technology Conference, May 10-12, 2014, Hamamatsu, pp. 1221-1224.

(Continued)

*Primary Examiner* — Peter J Macchiarolo
*Assistant Examiner* — Mohammed E Keramet-Amircolai
(74) *Attorney, Agent, or Firm* — David S. Safran; Roberts Calderon Safran & Cole, P.C.

(57) ABSTRACT

A magnetic-inductive flowmeter with a measuring tube and at least one measuring electrode has at least one opening in its circumferential wall, at least a electrode head of the at least one measuring electrode being arranged in the at least one opening. At least one coil pair has first and second coils that are arranged offset to one another on the circumferential wall of the measuring tube in the axial direction of the measuring tube. The first and second coils are arranged at least partially overlapping to one another in a top view of a cross section through the measuring tube. The at least one measuring electrode is arranged in a peripheral area of the circumferential wall of the measuring tube that is located between the first and the second coil of the at last one coil pair.

27 Claims, 8 Drawing Sheets

(56) References Cited

U.S. PATENT DOCUMENTS

| | | | | |
|---|---|---|---|---|
| 2009/0071264 | A1* | 3/2009 | Wray | G01F 1/588 |
| | | | | 73/861.12 |
| 2013/0289897 | A1* | 10/2013 | Yamaguchi | G01F 1/588 |
| | | | | 702/45 |
| 2014/0083199 | A1* | 3/2014 | Rogers | G01F 1/584 |
| | | | | 73/861.12 |
| 2015/0268076 | A1* | 9/2015 | Florin | G01F 1/60 |
| | | | | 73/861.12 |
| 2016/0341582 | A1 | 11/2016 | Lim et al. | |
| 2016/0377463 | A1* | 12/2016 | Kalvoda | G01F 1/58 |
| | | | | 73/861.11 |

OTHER PUBLICATIONS

A. Trächtler, A. Wernsdörfer; Direct Albebraic Reconstruction in Electromagnetic Flow Tomography; Frontiers in Industrial Process Tomography; Proceedings of the Engineering Foundation Conference Held At the Cliffs Shell Beach, California; Oct. 29-Nov. 1995; Engineering Foundation, New York, New York; pp. 159-170.

A. Trächtler; Tomographische Methoden Bei Der Induktiven Durchflussmessung Zur Bestimmung Von Stömungsprofilen Und—Parametern; in: TM—Technisches Messen, BD. 64, 1997, pp. 365-373.

* cited by examiner

MAGNETIC-INDUCTIVE FLOWMETER AND CORRESPONDING METHOD

BACKGROUND OF THE INVENTION

Field of the Invention

The present invention relates to a magnetic-inductive flowmeter (MID) with a measuring tube and at least one measuring electrode, wherein the measuring tube comprises an inflow section and an outflow section, which are spaced to one another in an axial direction of the measuring tube. The measuring tube has at least one opening on its circumferential wall, in which at least one measuring electrode with its electrode head is arranged. A magnetic field is generated via a coil arrangement, which permeates the inside of the measuring tube. Furthermore, the invention relates to a method for such a magnetic-inductive flowmeter.

Description of Related Art

The measuring principle of magnetic-inductive flowmeters is based on the separation of moving charges in a magnetic field. The meteorological basis is formed by a measuring tube of a non-magnetic material, for example, of a non-magnetic metal or of plastic, which is electrically insulated from the measuring fluid on the flow side by an insulating lining and which is permeated by a magnetic field perpendicular to the flow direction generated by the magnetic unit—for example, using coils. If the measuring tube has a measuring fluid flowing through it having a minimum electric conductivity, the charge carriers, ions or charged particles present in the conductive measuring fluid are diverted by the magnetic field. Due to the charge separation, a voltage results at the measuring electrodes arranged perpendicular to the magnetic field and to the direction of flow, the voltage being measured by a measuring device and evaluated as measuring voltage. The value of the measured voltage is thereby proportional to the speed of the flow of charges moving with the measuring fluid.

By using several electrodes, a volume flow can also be determined. Such a measuring device is known from the publication "Electromagnetic flowmeter with Multiple Poles and Electrodes" from Taiichi Tshima et al. from the Proceeding of Instrumentation and Measurement Technology Conference (IMTC/94, 3, May 10 to 12, 1994, pp 1221-1224) in Hamametsu; Japan. This device comprises several coils and measuring electrodes that are arranged in a plane perpendicular to the measuring tube.

A disadvantage of the known measuring unit is that it only allows for imprecise measurement of the speed of flow, in particular in speed distribution that is not rotation symmetrical.

SUMMARY OF THE INVENTION

Based on the above-described prior art, a primary object of the present invention is to provide a magnetic-inductive flowmeter and a method for it that allows for a more exact measurement of the speed of flow compared to the prior art.

The above-described object is achieved with the magnetic-inductive flowmeter described in the introduction in that at least one coil pair is provided with a first coil and a second coil, wherein the first and the second coil of the at least one coil pair are arranged offset to one another in the axial direction of the measuring tube on the circumferential wall of the measuring tube. The first and the second coil are arranged thereby at least partially overlapping one another in a top view of a cross section through the measuring tube. The at least one measuring electrode is arranged in a peripheral area of the circumferential wall of the measuring tube, wherein the peripheral area is located between the first and the second coil of the at least one coil pair. It is particularly advantageous hereby that at least one coil pair consisting of two coils is arranged offset to one another and that the at least one electrode located between to coil pair is arranged on the peripheral area of the circumferential wall of the measuring tube. In using two coils spaced axially from one another, a (aggregate) magnetic field can be generated, which, predominantly or solely has one component, for example in a plane running through the middle of both coils perpendicular to the cross section of the measuring tube, the component indicating a direction perpendicular to the flow of the measuring fluid. Components of the (individual) magnetic fields indicating the direction of flow of the measuring fluid are partially or completely compensated or canceled out by the respective (individual) magnetic field of the other coil. And, the at least one measuring electrode is arranged precisely in this peripheral area. The measured results of this measuring electrode are more exact than the measured results of the measuring device known from the prior art due to the improved alignment of the magnetic field, which is preferably predominately perpendicular to the direction of flow of the measuring fluid. Particularly good measurement results are thereby generated when the first and the second coil of the at least one coil pair are arranged offset to one another only in the axial direction of the measuring tube and not in the circumferential direction of the measuring tube. Preferably, the first and the second coil thereby completely overlap one another in a top view of the cross section through the measuring tube. Furthermore, the first and the second coil are preferably completely congruent to one another in a top view of the cross section through the measuring tube.

For easy orientation, the area located upstream is called the "inflow section" and the area located downstream is called the "outflow section" of the measuring tube. The cross section of the inflow section corresponds to the cross section of the outflow section. When discussing a cross section here, i.e. for example the connection cross section, then what is always meant here is the cross section or the surface of a cut through the measuring tube perpendicular to the direction of the flow of the measuring fluid. An "axial direction of the measuring tube" is also to be understood as the "longitudinal direction of the measuring tube". The direction of flow of the measuring fluid also runs along the axial direction of the measuring tube.

According to a preferred design of the invention, it is provided that the first and the second coil of the at least one coil pair are arranged radial to the axial direction of the measuring tube and perpendicular to a direction of flow at the circumferential wall of the measuring tube. Additionally or alternatively, this can also hold true for the at least one measuring electrode. This electrode can also be arranged radial to the axial direction of the measuring tube and, thus, at or with its electrode head perpendicular to the direction of flow at the circumferential wall of the measuring tube. A particularly homogeneous magnetic field can be generated by the arrangement of coils according to the invention. The magnetic field can be positioned using the arrangement according to the invention in such a manner that the electrode head or the longitudinal axis through the measuring electrode is arranged perpendicular to the magnetic field and thus perpendicular to the direction of flow of the measuring fluid. This allows for a particularly exact measurement of the speed of flow.

It is provided in a preferred design of the present invention that the at least one measuring electrode is as far away from the first coil of the at least one coil pair as from the second coil of the at least one coil pair. This accomplishes that the at least one measuring electrode is arranged in the axial direction of the measuring tube at the location on the measuring tube, at which the magnetic field generated by both coils of the at least one coil pair has only one component perpendicular to the direction of flow.

Depending on the number of coil pairs used, it can be advantageous when the at least one measuring electrode in a top view of a cross section through the measuring tube is arranged overlapping in respect to the first and second coil of the at least one coil pair or offset in the peripheral direction in respect to the first and second coil of the at least one coil pair. "Overlapping" is to be understood in that the at least one measuring electrode is arranged offset from the first and the second coil of the at least one coil pair in the axial direction of the measuring tube, wherein an imaginary straight line that runs parallel to the axial direction of the measuring tube through the first and the second coil also runs through the measuring electrode. "Completely overlapping" is to be understood in that the imaginary straight line that runs parallel to the axial direction of the measuring tube runs respectively perpendicular through the longitudinal axis of both coils and optionally through the longitudinal axis of the measuring electrode. "Congruent" is to be understood in that the individual coils have the same spatial size and no coil is located in front of or behind another.

In the case that an even number of coil pairs are arranged on the measuring tube, it can be achieved in this manner (measuring electrode is arranged overlapping to the coils) that the at least one measuring electrode is arranged perpendicular to the magnetic field of the further coil pair. Preferably, the measuring electrode is, however, offset in the circumferential direction to the first and the second coil of the at least one coil pair. Thereby, the measuring electrode does not have to be arranged exactly perpendicular to the magnetic field of the at least one coil pair. It is also sufficient when an imaginary straight line through the longitudinal axis of the at least one measuring electrode has a component that possesses a portion that runs perpendicular to the magnetic field. Preferably, the straight line runs predominately perpendicular to the magnetic field (more than 45°).

In order to ensure that only one magnetic field is provided in one plane, which runs perpendicular to the axial direction of the measuring tube and is arranged between the first and the second coil of the least one coil pair, the magnetic field being predominately or only perpendicular to the direction of flow, the first and the second coil of the at least one coil pair are supplied with a current that is identical in height and direction. This is preferably achieved in that the first and the second coil are connected electrically in series. This is valid for all coil pairs of the magnetic-inductive flowmeter.

This effect is enhanced in that all coils or only respectively the first and the second coil of each coil pair are constructed identically to one another in respect to their characteristics such as geometry and/or winding number and/or winding cross section and/or production material.

In order to be able to also measure speed distribution that is not rotation symmetrical, the magnetic-inductive flowmeter in a further design of the present invention comprises several, in particular n coil pairs with n≥2, preferably n≥3, more preferably n≥4, further more preferably n≥6, further more preferably n≥8, further more preferably n≥10 and further more preferably n≥12. Each of these n coil pairs has a first and a second coil that are arranged spaced from one another only in the axial direction of the measuring tube on the circumferential wall of the measuring tube. Additionally or alternatively, the magnetic-inductive flowmeter comprises at least m measuring electrodes with m≥2, preferably m≥3, more preferably m≥4, further more preferably m≥6, further more preferably m≥8, further more preferably m≥10, and further more preferably m≥12, which are arranged in a peripheral area on the circumferential wall of the measuring tube, wherein the peripheral area is designed between the first and the second coil of the coil pairs.

The first coils of the at least n coil pairs are thereby arranged in a first coil plane that runs perpendicular through the measuring tube. The second coils of the at least n coil pairs are arranged in a second coil plane that also runs perpendicular through the measuring tube. The same holds true for the at least m measuring electrodes. They are arranged in a measuring plane that runs perpendicular through the measuring tube. The first coil plane, the second coil plane and the measuring plane are spaced from one another in the axial direction and parallel to one another. This accomplishes a particularly symmetrical construction, which positively affects the measuring accuracy of the magnetic-inductive flowmeter.

This measuring accuracy is further increased in that the measuring plane, in which the m measuring electrodes are arranged, is spaced at the same distance from the first coil plane and the second coil plane.

The distance of the individual first coils of the n coil pairs and the second coils of the n coil pairs among one another is preferably the same in the circumferential direction of the measuring tube. This means that the first and the second coils of the at least n coil pairs are each arranged spaced to one another at α=360°/n at the circumferential wall of the measuring tube. Additionally or alternatively, this also holds true for the at least m measuring electrodes, which are preferably also each arranged spaced to one another at α=360°/m at the circumferential wall of the measuring tube. Preferably, there are as many coil pairs as measuring electrodes. Of course, it is also possible to have fewer coil pairs than measuring electrodes or fewer measuring electrodes than coil pairs. Preferably, the difference between the coil pairs and the measuring electrodes is always a whole multiple. In the case that there are two coil pairs, the magnetic-inductive flowmeter should comprise two, four, six or eight, etc. measuring electrodes.

In order to reduce leakage fluxes, the at least one, in particular, all of the n coil pairs has a coil core that are formed of a magnetic-conductive medium, such as iron. The windings of the coil are wound around such a coil core. In order to optimally guide the magnetic flux and to be able to achieve a greater stability of the entire arrangement, the coil cores of all first coils of the at least n coil pairs are connected to one another at their first ends via a yoke. The same holds true, preferably, for the coil cores of all second coils of the at least n coil pairs. These are connected to one another at their first ends via a second yoke. This connection is preferably a screw connection.

In order to control the entire arrangement, the magnetic-inductive flowmeter comprises a signal generator, a measuring unit and a control unit. Each of the at least one measuring electrodes is at least indirectly connected to an input of the measuring unit. Furthermore, each of the at least one coil pairs is at least indirectly connected to an output of the signal generator. The control unit is thereby designed for controlling the signal generator and the measuring unit so that the measuring unit detects a measuring voltage of at least the one measuring electrode that is arranged perpendicular or with one component perpendicular to the magnetic field. In order to obtain an as homogeneous as possible magnetic field, the control unit is designed for controlling the signal generator so that the respective first and second coils of two coil pairs that are arranged offset by 180° in the peripheral direction around the measuring tube generate a magnetic field, which is directed in the same direction and preferably has the same size. In such a case, the measuring accuracy is particularly high. Preferably, two measuring electrodes are always used thereby, wherein a differential measuring voltage is measured. In using only one measuring electrode, the measured measuring voltage would relate to the potential on which the measuring tube is located.

In order to also be able to measure speed distribution that is not rotationally symmetrical with a high accuracy, the control unit is designed for controlling the signal generator so that the magnetic field that permeates the measuring tube is a homogeneous or an inhomogeneous magnetic field. It is thereby possible that the individual coil pairs are alternately supplied with current so that a homogeneous magnetic field rotates around the longitudinal axis of the measuring tube.

The signal generator excites the first and the second coils with a clocked constant field or with a sinusoidal signal. The coil pairs can thereby be successively excited, i.e., temporally spaced to one another, by the clocked constant field. A coded excitation is also possible (CDMA). Conversely, it is also possible that the individual coil pairs are successively excited, i.e., temporally spaced, by the sinusoidal signal. A simultaneous excitation using different frequencies is also possible here.

Additionally, it is particularly advantageous when the measuring unit comprises an I/Q demodulator in order to separate the measured voltage from interference signals. In this case, the in-phase component is applied to the measuring signal together with possible capacitive cross-talkers, wherein the latter can be filtered out. Only further interference such as coupling or vortices are applied in the quadrature phase components. I/Q demodulation can be implemented, for example, by means of the heterodyne method.

The method according to an embodiment of the invention is used for determining an axial flow speed distribution for a magnetic-inductive flowmeter. This operates using the DAR method. A weighting function is used in the DAR method. According to the invention, an iterative method is implemented in this weighting function. This allows for deviations between a reconstructed flow speed distribution and a provided flow speed distribution to be decreased.

In detail, there is a plurality of possibilities for designing the magnetic-inductive flowmeter according to the invention as will be apparent from the following description of preferred embodiments in conjunction with the accompanying drawings.

DETAILED DESCRIPTION OF THE INVENTION

Figure 1A:
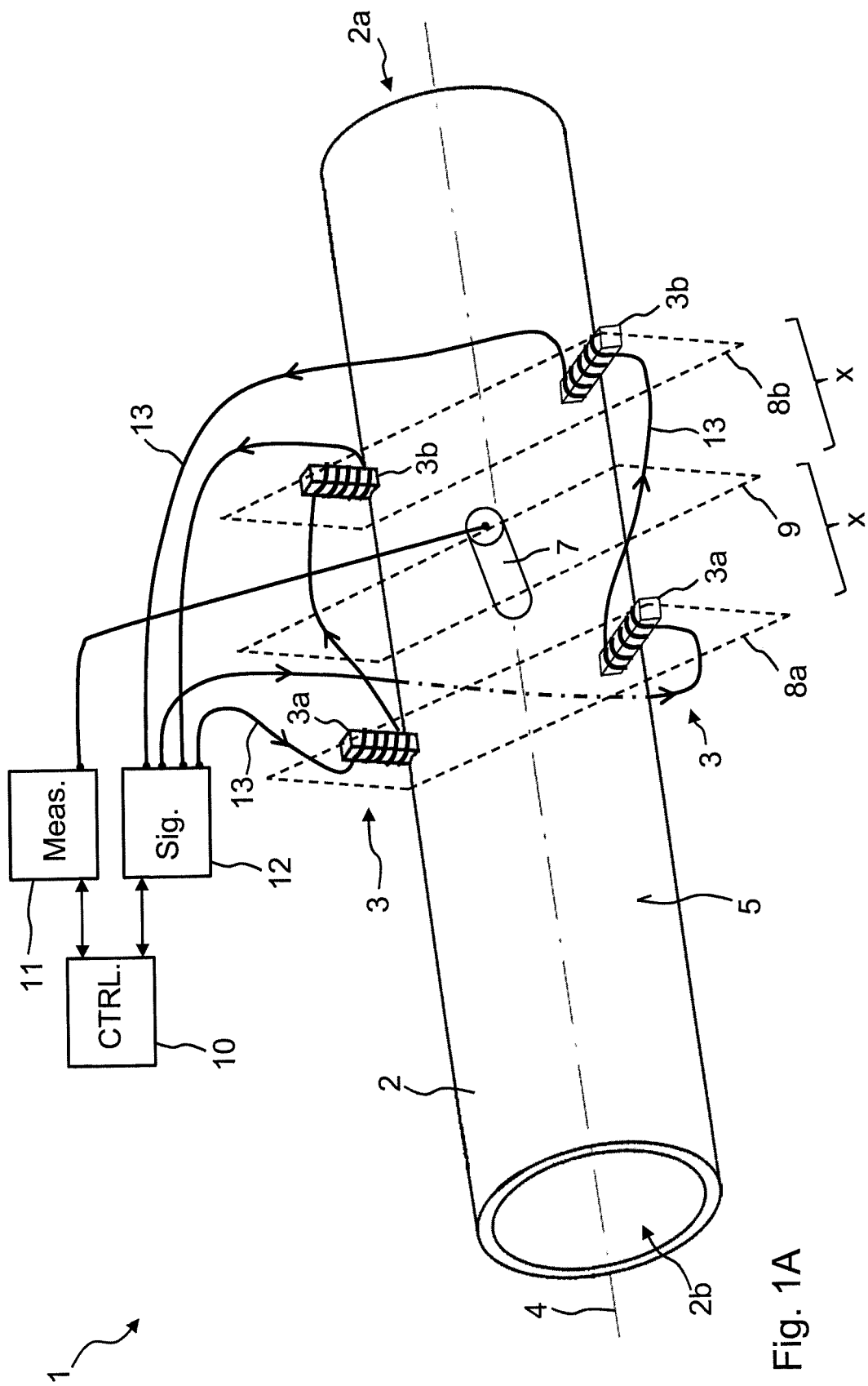
FIG. 1A is a perspective view of first embodiment of a magnetic-inductive flowmeter according to the invention having a measuring tube, two coil pairs and a measuring electrode that are directly connected to a signal generator and a measuring unit.

FIG. 1 shows a first embodiment of a magnetic-inductive flowmeter 1 according to the invention having a measuring tube 2 and two coil pairs 3 and at least one measuring electrode 7. The measuring tube 2 has an inflow section 2a and outflow section 2b, which are spaced from one another in the axial direction 4 of the measuring tube 2. An axis is shown in FIG. 1A, which runs in the axial direction 4 of the measuring tube 2. The measuring tube 2 has at least one opening 6 (shown in FIG. 2) on its circumferential wall 5, into which the at least one measuring electrode 7 joins or is arranged with its electrode head 7a (shown in FIG. 2).

The at least one coil pair 3 comprises a first coil 3a and a second coil 3b. Both the first coil 3a as well as the second coil 3b of the at least one coil pair 3 are arranged offset to one another in the axial direction 4 of the measuring tube 2 on the circumferential wall 5 of the measuring tube 2. The first and the second coil 3a, 3b are preferably only, i.e. exclusively arranged offset to one another in the axial direction. In particular, they are not arranged offset to one another in the circumferential direction.

The measuring electrode 7 is arranged in a peripheral area of the circumferential wall 5 of the measuring tube 2, the area being located between the first and the second coil 3a, 3b of the at least one coil pair 3. In FIG. 1A and also in view of FIG. 2, the first and the second coil 3a, 3b of the at least one coil pair 3 are arranged radial to the axial direction 4 of the measuring tube 2 and perpendicular to the direction of flow on the circumferential wall 5 of the measuring tube 2. This also holds true for the at least one measuring electrode 7.

The coils 3a, 3b of a coil pair 3 are preferably constructed identically to one another in view of their characteristics such as geometry and/or winding number and/or winding cross section and/or production material. This is necessary because the coils 3a, 3b of a coil pair are always preferably supplied with the same current at the same time, so that it is ensured by their identical construction that the magnetic fields generated by them are respectively of the same size and directed in the same direction.

Figure 1B:
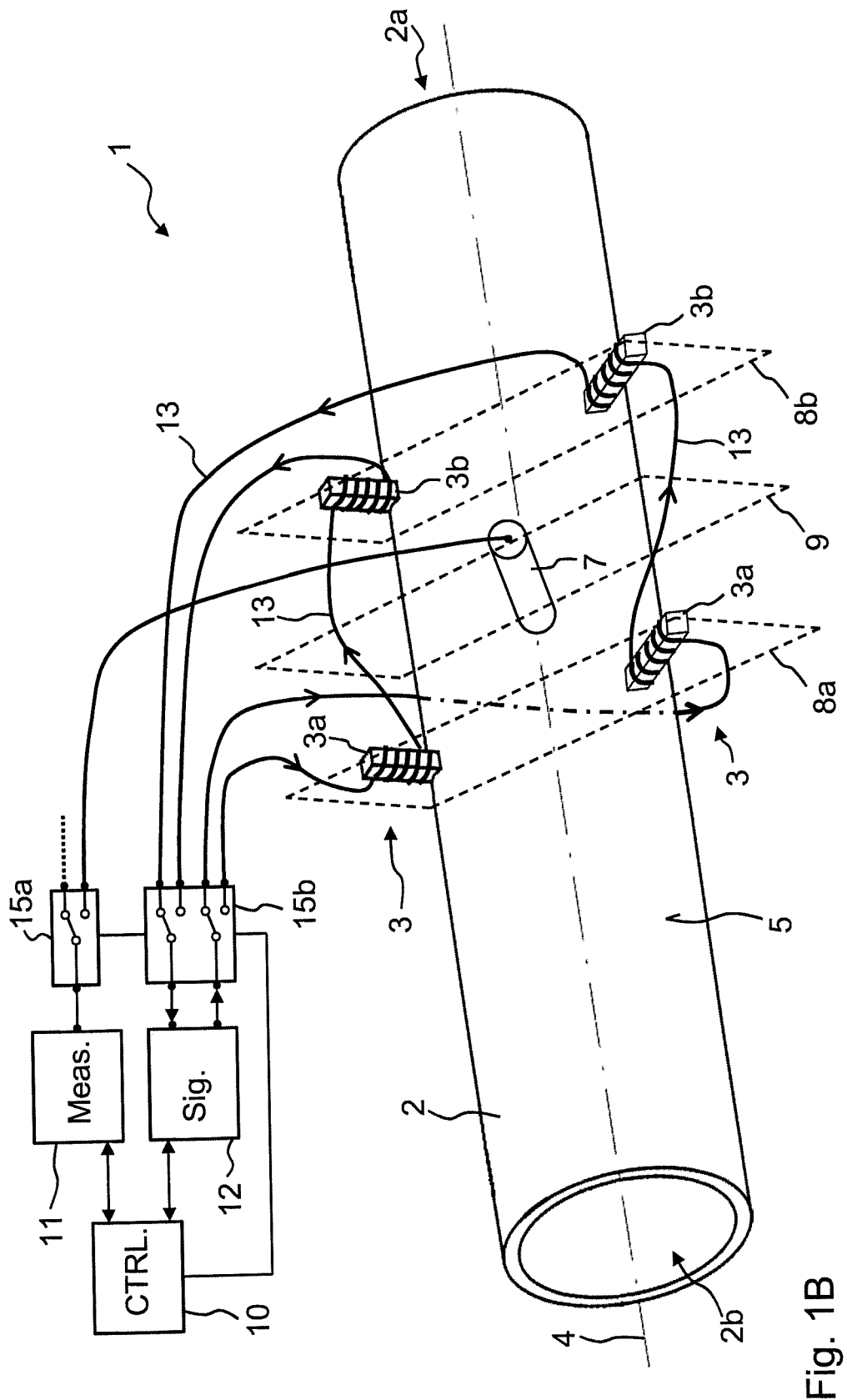
FIG. 1B is a perspective view of a further embodiment of the magnetic-inductive flowmeter according to the invention having a measuring tube, two coil pairs and a measuring electrode that are indirectly connected to a signal generator and a measuring unit.

In FIG. 1A, as well as in FIG. 1B, the first coils 3a of all coil pairs 3 are arranged in a first coil plane 8a. This first coil plane 8a runs perpendicular through the measuring tube 2. The same holds true for the second coils 3b of all coil pairs 3. These are arranged in a second coil plane 8b that runs perpendicular through the measuring tube 2. Likewise, all measuring electrodes 7 are arranged in one measuring plane 9, which runs perpendicular through the measuring tube 2. The first coil plane 8a and the second coil plane 8b, as well as the measuring plane 9 are arranged spaced from and parallel to one another. The measuring plane 9 is thereby arranged between the first coil plane 8a and the second coil plane 8b. It is spaced at a same distance from both coil planes 8a, 8b. This is represented in FIG. 1A by the distance x.

The magnetic-inductive flowmeter 1 additionally comprises a control unit 10, a measuring unit 11 and a signal generator 12. Both coil pairs 3 (it is also possible to have more coil pairs 3) in FIG. 1A are directly connected to an output of the signal generator 12. This connection takes place via the connection line 13. The signal generator 12 is preferably a current source. The signal generator 12 can excite the coils 3a, 3b of the individual coil pairs 3 with both a clocked constant field as well as with a sinusoidal signal. The signal generator is thereby controlled by the control unit 10.

So that both coils 3a, 3b of a coil pair 3 generate approximately the same magnetic field, they are not only identically constructed, but also connected in series, so that they have the same electric current flowing through them.

The at least one measuring electrode 7 is connected to the measuring unit 11 in FIG. 1A. Preferably, there is more than one measuring electrode 7, wherein the measuring unit 11 is designed for measuring a preferably differential voltage between two respective measuring electrodes 7.

As opposed to FIG. 1A, the coils 3a, 3b of the individual coil pairs 3 are only indirectly connected to the signal generator 12 in the further embodiment of the magnetic-inductive flowmeter 1 according to the invention in FIG. 1B. The same holds true for the at least one measuring electrode 7, which is also only indirectly connected to the measuring unit 11.

In this case, the measuring unit 11 comprises only one signal input. For this reason, there is a first switch unit 15a that has several ports, to which the individual measuring electrodes 7 are connected. In the following, controlled by the control unit 10, this switch unit connects solely one measuring electrode 7 at a time to the input of the measuring unit 11. The switch of the first switch unit 15a can be designed as a relay in the simplest case. Preferably, however, it is a semi-conductor switch element, so that the measuring voltage can be supplied to the measuring unit 11 in very fast intervals. Preferably, however, two measuring voltages are always supplied to the measuring unit 11 by the first switch unit 15a, whereby a differential measurement is possible. Such a switch unit is, however, not shown in FIG. 1B. The decision of which measuring voltage is supplied by which measuring electrode 7 to the measuring unit 11 is carried out via the control unit 10.

In FIG. 1B, a second switch unit 15b is also shown. The second switch unit 15b connects an output or input of the signal generator 12 to one of several coil pairs 3. This means that the coil pairs 3 are only indirectly connected to the signal generator 12. Consequently, in the embodiment of FIG. 1B, only one coil pair 3 at a time can be supplied with current. Of course, it is also possible that there is more than a first or a second switch unit 15a, 15b. In this case, several coil pairs 3 at a time can be supplied with current.

It is also possible that the signal generator 12 excites the individual coil pairs 3 with different signals. These signals, for example, can differ in their frequencies (FDMA; Frequency Division Multiple Access). The individual coil pairs 3 can also be excited temporally spaced from one another with a sinusoidal signal (TDMA; Time Division Multiple Access).

In the case that the signal generator 12 excites the coils 3a, 3b of the at least one coil pair 3 with a clocked constant field, this clocked constant field excites the individual coils 3a, 3b temporally space from one another. It is also possible that this clocked constant field is coded (CDMA; Code Division Multiple Access), wherein, in this case, the signal generator 12 ensures that the individual coils 3a, 3b are not saturated.

In a coded excitation (CDMA) by means of a clocked constant field, a simultaneous field excitation can take place. For example, all coils arranged perpendicular to an imaginary plane of reference can be supplied with current at an interval of one second for a certain amount of time, wherein all coils that are arranged parallel to the same plane of reference are supplied with current at an interval of 0.5 seconds for a further certain amount of time.

The measuring unit 11 in this case preferably has an I/Q demodulator for separating the measuring voltage from the interference signals.

In exciting the individual coil pairs with different frequencies (FDMA), the excitation of all coil pairs 3 can take place simultaneously, wherein all field configurations are simultaneously excited. It is thereby also possible that a limited field strength can be set for each subfield.

In order to increase the accuracy of the magnetic-inductive flowmeter 1, the flowmeter can be calibrated. For this, the speed of a measuring fluid is measured using another known method or can accordingly be provided. A constant factor can be determined from the difference between the measured speed and the actual speed, which is necessary for a linear scale. This control unit 10 is thereby designed for carrying out this calibration method. Furthermore, an offset compensation can be carried out at zero flow. A factor for scaling is also determined here, which is used for determining the flow speed of the measuring fluid.

Figure 2:
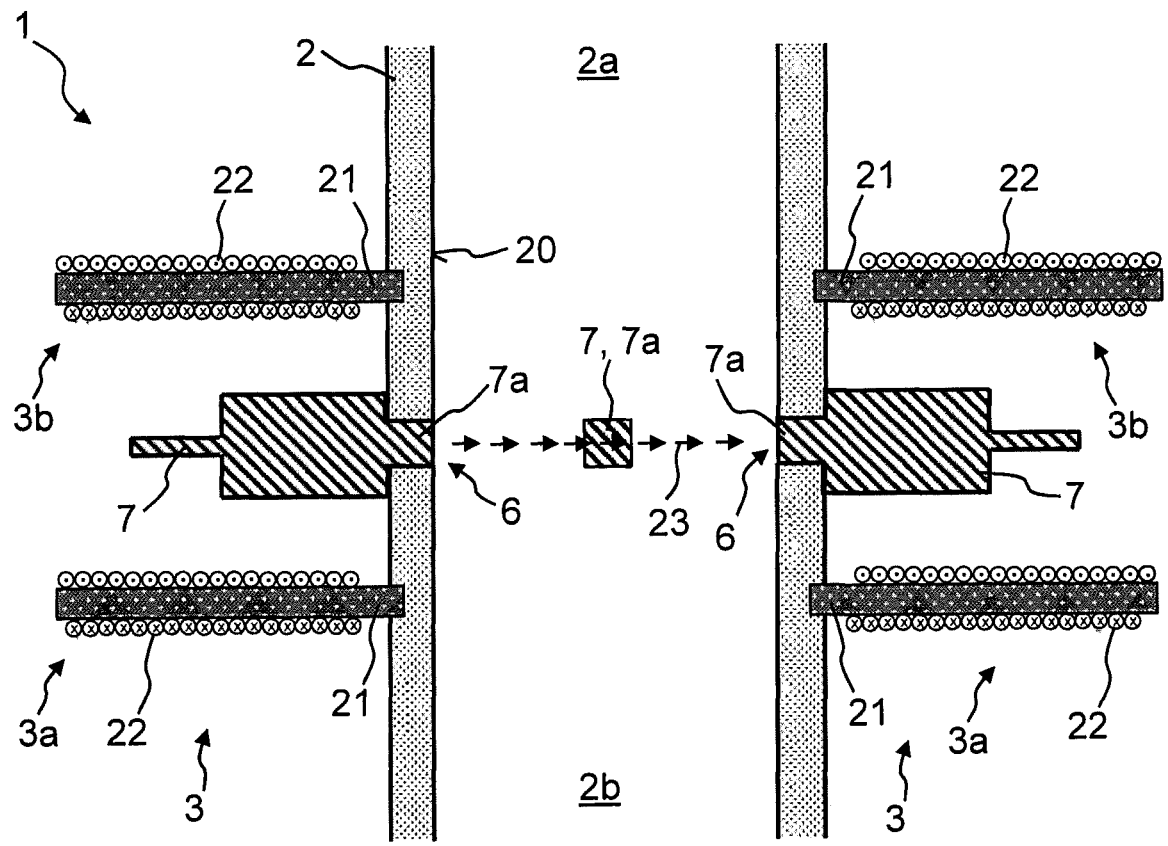
FIG. 2 is a longitudinal sectional view through the measuring tube of the magnetic-inductive flowmeter according to the invention.

FIG. 2 shows a longitudinal sectional view of the measuring tube 2 of the magnetic-inductive flowmeter 1 according to the invention. Three measuring electrodes 7 are shown. These measuring electrodes 7 with their electrode heads 7a are galvanically separated from the inner wall 20 of the measuring tube 2, in the case that the wall is electrically conductive. The electrode heads 7a close flush with the inner wall 20 of the measuring tube 2. Thus, the flow behavior is influenced as little as possible. The shown measuring electrodes 7 are arranged offset to one another on the circumferential wall 5 of the measuring tube 2.

Two coil pairs 3 are also shown in FIG. 2, which have a first coil 3a and a second coil 3b. The coils 3a, 3b each have a coil core 21, around which the individual coils 22 are arranged. The coil core 21 extends partially into the circumferential wall 5 of the measuring tube 2. This, however, is not necessarily required. The coil core 21 can also be spaced from the measuring tube 2.

Both coil pairs 3 in FIG. 2 are arranged spaced by 180° from one another on the circumferential wall 5 of the measuring tube 2. The signal generator 12 excites the respective first and second coils 3a, 3b of both coil pairs 3 so that a magnetic field is generated by them, which is directed in the same direction and is preferably of the same size. This means that the magnetic flux flows through one coil core 21 in the opposite direction than the other coil core 21.

This magnetic field has only one component, in particular between two first and two second coils 3a, 3b, which runs perpendicular to the direction of flow of the measuring fluid. Such a magnetic field component 23 is shown in FIG. 2 using arrows.

The first and the second coils 3a, 3b of a coil pair 3 in FIG. 2 are arranged with their respective coil core 21 in such a manner on the circumferential wall 5 of the measuring tube 2 that the magnetic flux, which is supplied through the respective coil core 21, runs perpendicular to the direction of flow of the measuring fluid at the transition of the coil core 21 to the measuring tube 2.

Figure 3:
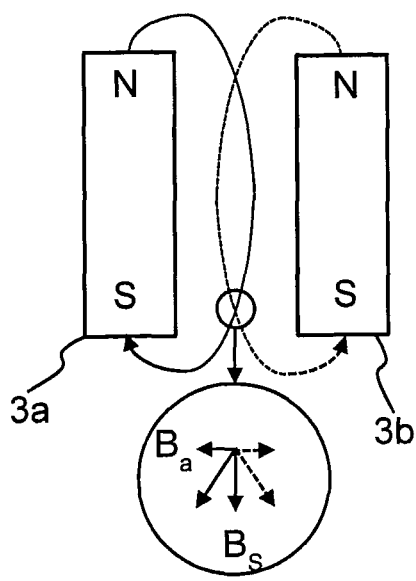
FIG. 3 is a principle circuit diagram of a coil pair that indicates that the magnetic field has only one component perpendicular to the direction of flow in the middle of the two coils of the coil pair.

FIG. 3 exemplifies a principle circuit diagram of a coil pair 3, which illustrates more clearly why the magnetic field possesses only one component $B_s$ perpendicular to the direction of flow in the middle of the two coils 3a, 3b of the coil pair 3. In the case that the magnetic field of both coils 3a, 3b is the same size and directed in the same direction, at least those components $B_s$ of the magnetic field that run in the direction of flow, i.e. in the axial direction 4 predominately, preferably completely, cancel each other out. The measuring plane 9 runs through this area, as is shown in FIGS. 1A and 1B.

Figure 4:
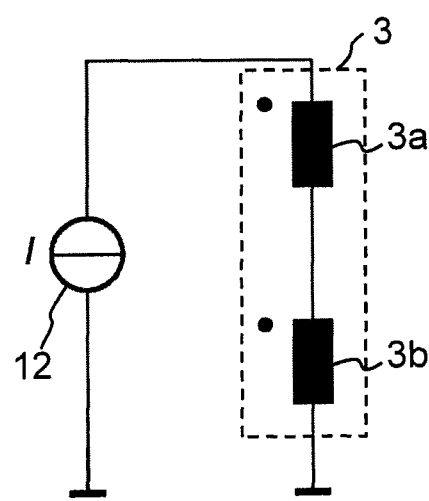
FIG. 4 is a series connection of the two coils of a coil pair.

FIG. 4 shows an equivalent circuit diagram of an electric circuit, which illustrates that the first and the second coil 3a, 3b are connected in series with a current source I. The windings 22 are also aligned identically. Both coils 3a, 3b of a coil pair 3 are preferably constructed identically to one another.

Figure 5:
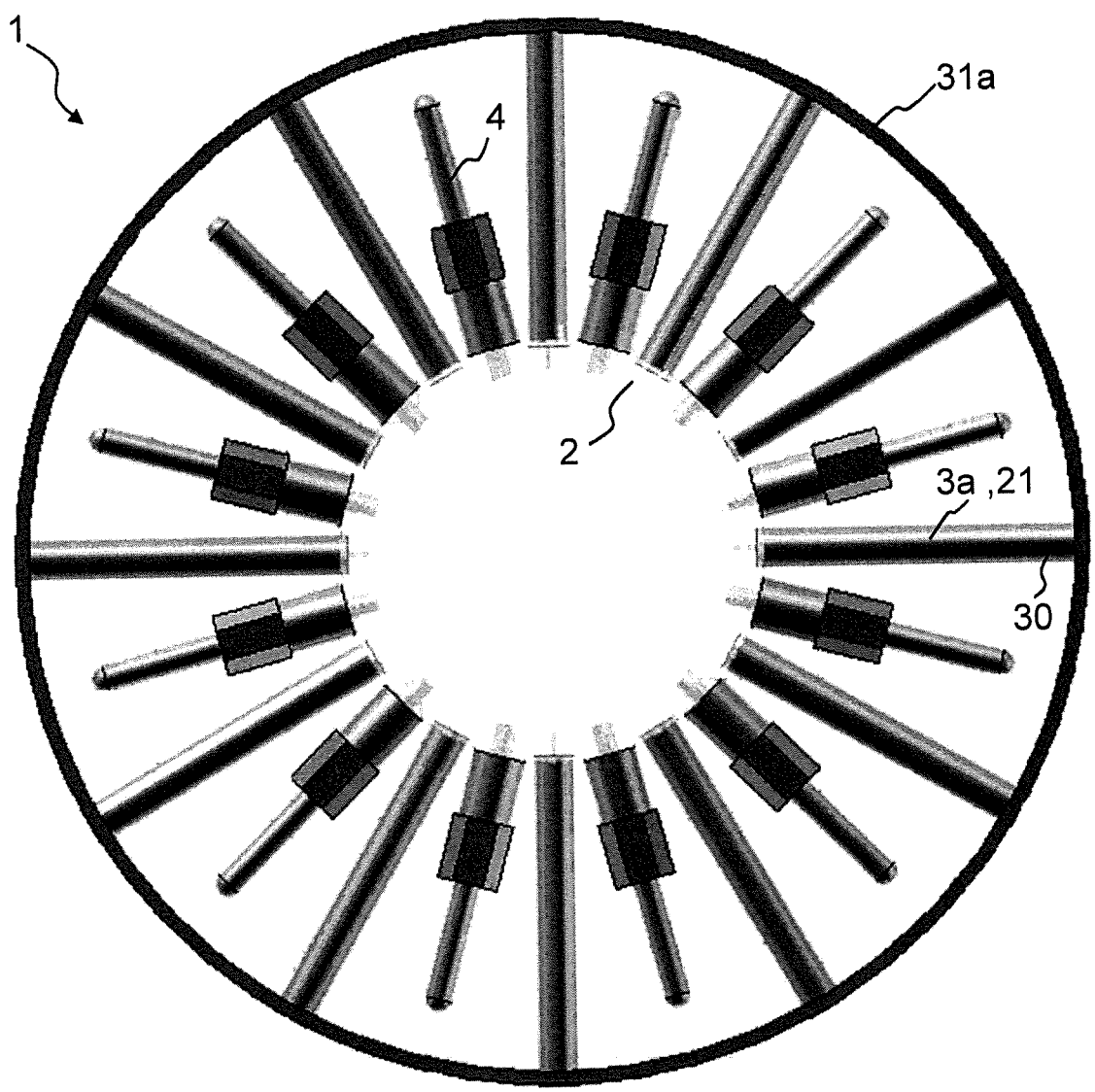
FIG. 5 is a top view of a cross section through the measuring tube of the magnetic-inductive flowmeter according to the invention, which shows the symmetrical arrangement of the coils and the measuring electrodes.

FIG. 5 shows a top view of a cross section through the measuring tube 2. Since the first and the second coil 3a, 3b of each coil pair 3 are offset relative to one another only in the axial direction 4, solely the coil core 21 of the first coil 3a is shown in FIG. 5. For an better overview, the windings 22 are not shown. The coil cores 21 of the second coils 3 are free of overlapping and are arranged congruent to the shown coil cores 21.

The coil cores 21 of the first coils 3a are connected to one another at their first ends 30 via a first yoke 31a. The first yoke 31a has a round cross section shape. The first yoke 31a is preferably formed as one piece.

The first coils 3a of the coil pairs 3 are arranged to be symmetric with respect to the axial direction 4 running through the measuring tube 2 on the circumferential wall 5 of the measuring tube 2.

The measuring electrodes 7 are arranged offset in the circumferential direction to the first and second coils 3a, 3b of each coil pair 3.

Figure 6:
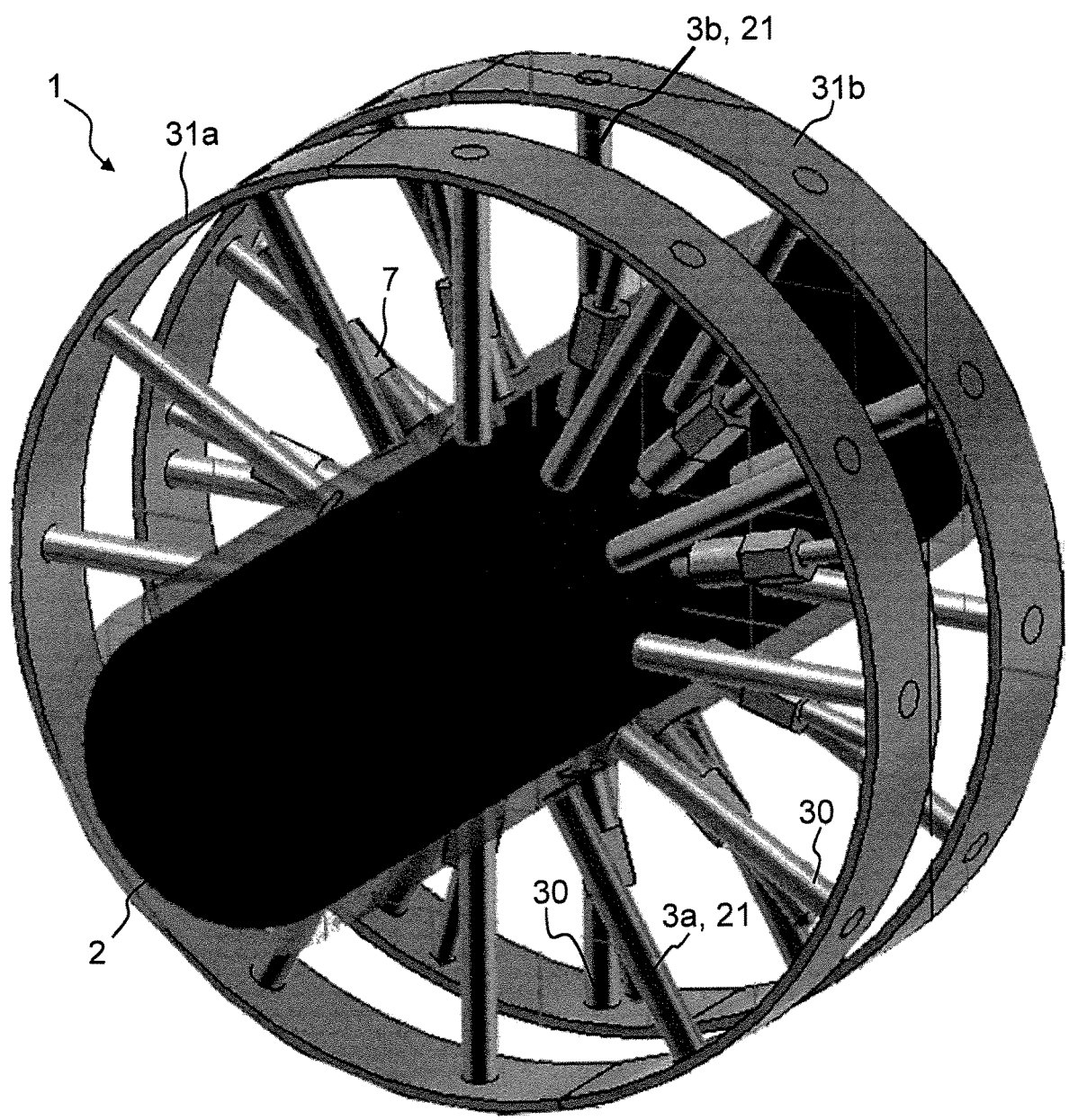
FIG. 6 is a perspective representation of the magnetic-inductive flowmeter according to the invention having several coil pairs and measuring electrodes.

FIG. 6 shows a spatial representation of the magnetic-inductive flowmeter 1, wherein the measuring tube 2 is shown cut open. The first end 30 of the coil core 21 of the first coil 3a is connected to the first yoke 31a and the first ends 30 of the coil cores 21 of the second coils 3b are connected to a second yoke 31b. The construction of the second yoke 31b corresponds to that of the first yoke 31a. Overall, there are n coil pairs 3, wherein the number 12 was chosen for n in the example of FIG. 6.

Additionally, there are twelve measuring electrodes 7 in FIG. 6. The at least n coil pairs are each arranged spaced to one another at α=360°/n on the circumferential wall 5 of the measuring tube 2. In this case, the angle is 30°. The same holds true for the m measuring electrodes 7, which are each arranged spaced to one another at α=360°/m on the circumferential wall of the measuring tube. In this case, the number of coil pairs 3 also corresponds to the number of measuring electrodes 7. However, this doesn't necessarily have to be the case.

In the case that the number of measuring electrodes 7 and coil pairs 3 is the same, the measuring electrodes 7 are arranged offset to one another in the circumferential direction at an angle β=α/2 compared to the coil pairs 3. In the example of FIG. 6, the measuring electrodes 7 are arranged offset to one another by 15° compared to the coil pairs 3. It is also possible that the measuring electrodes 7 are arranged only axially offset to the first and second coils 3a, 3b of the respective coil pairs 3. In this case, the measuring electrodes 7 would be arranged completely overlapping to the first and second coils 3a, 3b of the coil pair 3.

The individual coils 3a, 3b of the coil pairs 3, as well as the individual measuring electrodes 7, are arranged radially on the measuring tube 2. One plane that extends through the longitudinal axis of the first and the second coils 3a, 3b of a coil pair 3 preferably runs through the longitudinal axis 4 of the measuring tube 2.

Figure 7:
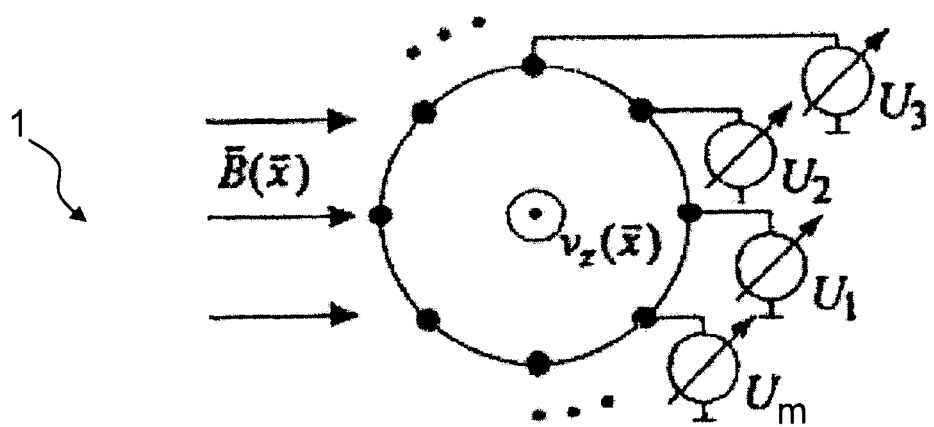
FIG. 7 is a simplified representation of a cross section through the measuring tube of the magnetic-inductive flowmeter which shows the arrangement of the measuring electrodes.

FIG. 7 illustrates the use of several measuring electrodes 7, which are arranged equally spaced from one another on the circumferential wall 5 of the measuring tube 2.

Figure 8A:
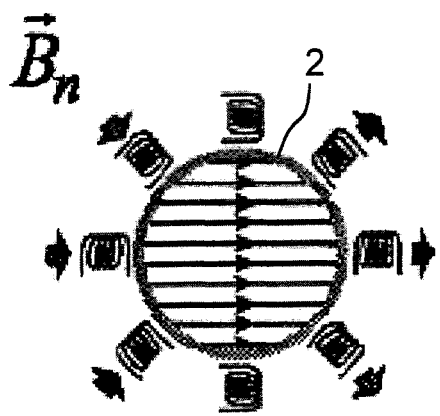
FIGS. 8A to 8F are different cross-sectional representations through the measuring tube of the magnetic-inductive flowmeter according to the invention that show differently formed magnetic fields.
Figure 8B:
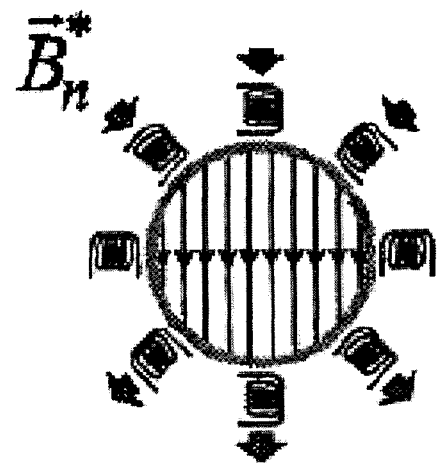

FIGS. 8A to 8F show different possibilities for exciting the coil pairs 3 in order to generate different magnetic fields. In FIGS. 8A and 8B, homogeneous magnetic fields are shown. The coils 3a, 3b, which are arranged solely in a left half of the measuring tube 2, are supplied with a first current, preferably of the same strength and the coils 3a, 3b, which are arranged solely in a right half of the measuring tube 2, are also supplied with a second current, preferably of the same strength. The current, in particular the direction of flow, is chosen so that the individual coil pairs 3 are thereby directed in the same direction.

In FIG. 8B, only the coil pairs 3 that are arranged exclusively in the upper, or exclusively in the lower half of the cross section through the measuring tube 2 are supplied with current.

Figure 8C:
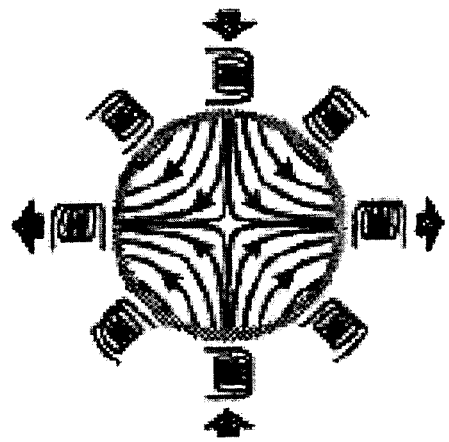
Figure 8D:
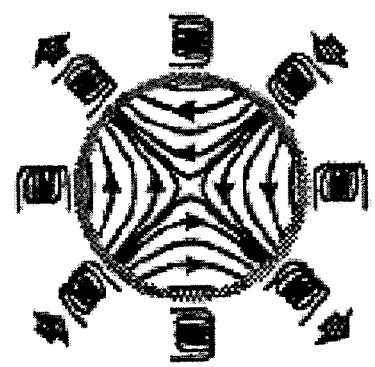

In FIG. 8C, only every second coil pair 3 is supplied with current, wherein the direction of flow changes alternately. The same holds true for FIG. 8D, wherein the coil pairs 3 that were not supplied with current in 8C are now supplied with current. If different coil pairs 3 are alternately (iteratively) supplied successively with current, then a rotary magnetic field can be generated.

Figure 8E:
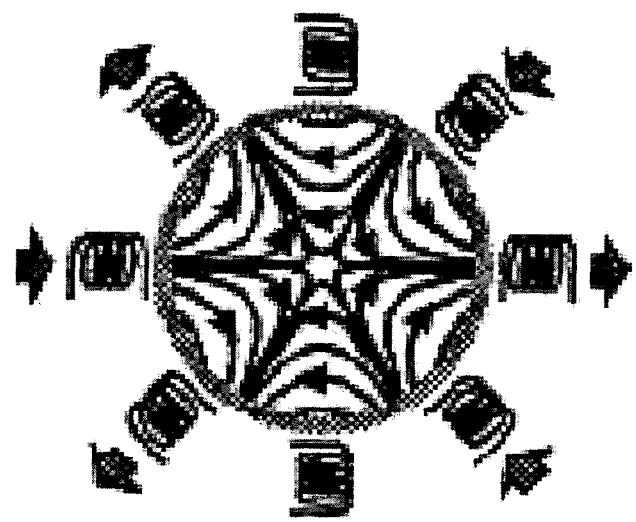

In FIG. 8E, only the coil pairs 3 that are arranged exclusively in the left or exclusively in the right side of the measuring tube 2 are supplied with current again. Thereby, the direction of current with which the coil pairs 3 are supplied alternates.

Figure 8F:
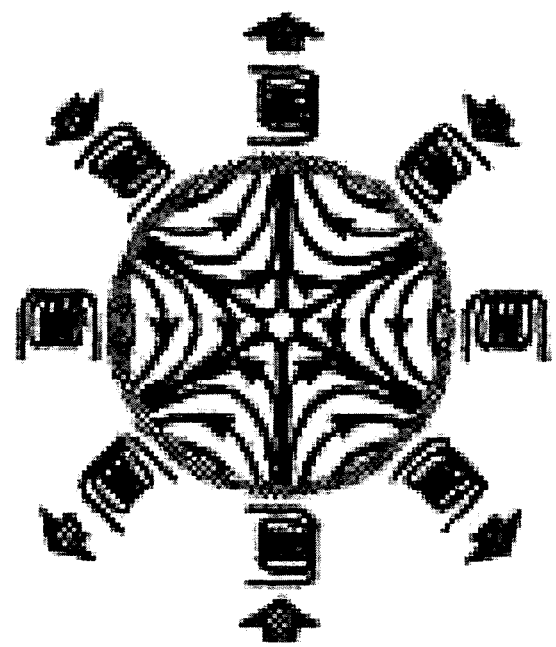

The same holds true for FIG. 8F. Here, only the coil pairs 3 that are located exclusively in an upper or exclusively in a lower half of the cross section of the measuring 2 are supplied with current.

In order to be able to determine the flow speed, a tomographic reconstruction method can be used. This includes analytical methods (e.g. direct fourier method), discrete methods (e.g. ART) and direct algebraic reconstruction (DAR).

In the following, a method for determining the flow speed is described, which is based on the DAR method. The DAR method is described in detail in the publication "TRÄCHTLER; A and WERNSDÖRFER A., (1995), Direct Algebraic Reconstruction in Electromagnetic Flow Tomography, Frontiers in Industrial Process Tomography, pages 159 to 170", to which reference is made here.

Figure 9:
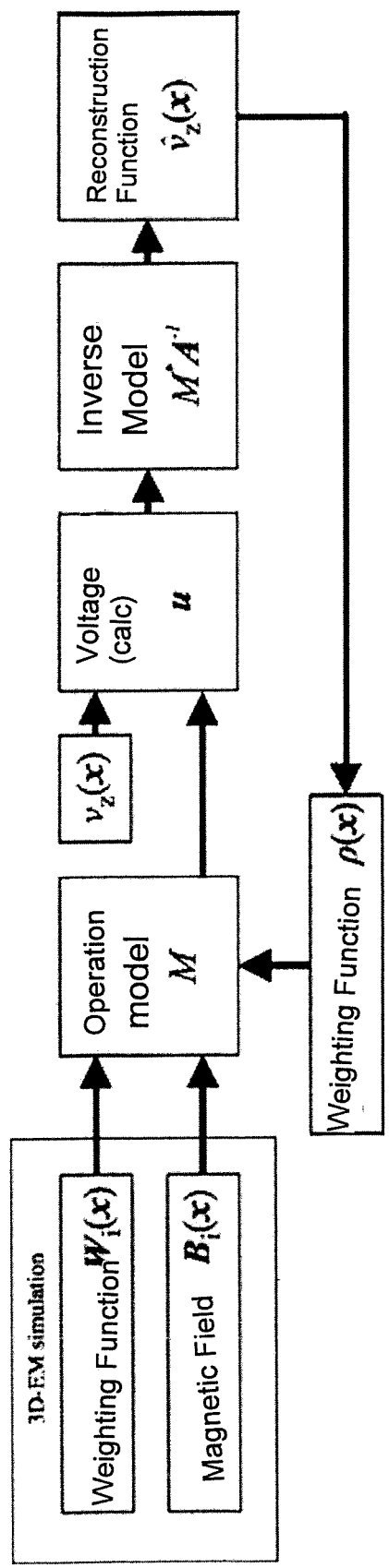
FIG. 9 is a flow chart indicated the reconstruction of the flow speed distribution according to the invention.

FIG. 9 shows a model for determining the flow speed. This model is known from the above-mentioned publication. As opposed to the publication, the present invention—in terms of the method—illustrates an improved construction of the calibration function ρ(x), whereby more exact measuring results for the flow speed can be achieved. The calibration function ρ(x) is also called weighting function ρ(x) in the following.

In the following, the DAR method is briefly introduced. The desired flow speed, or, respectively the axial flow speed distribution $v_z(x)$ is included in the following equation:

$$u_i = \iint_\Omega (W'_{x,i}(x)B_{y,i}(x) - W'_{y,i}(x)B_{x,i}(x))v_z(x)dxdy \quad (1)$$

The term W' is the (three dimensional) weighting function. This is dependent on the geometry of the magnetic-inductive flowmeter and is preferably determined by means of a three dimensional electromagnetic simulation. An analytic determination of this variable is also possible, however, it should be taken into account that the measuring electrodes 7 have an electrode head 7a, which is not point-like, rather has a significant surface. Thereby, $W_{x,i}$ and $W_{y,i}$ are the x- and y-components of the weighting function. $B_{x,i}$ and $B_{y,i}$ are the components of the magnetic field. The operator M describes a mapping of the speed field $v_z(x)$ in the finite space $\mathbb{R}^m$ in of the voltage measurement:

$$u_i = \iint_\Omega \rho(x)\rho^{-1}(x)(W'_{x,i}(x)B_{y,i}(x) - W'_{y,i}(x)B_{x,i}(x))v_z(x)dxdy \quad (2)$$

$$= \iint_\Omega \rho(x)k_i(x)v_z(x)dxdy = M_i v_z(x)$$

ρ(x) is a weighting function. The construction according to the invention of this weighting function is described in more detail below. The characteristic function $k_i(x)$ is contained in the physical model of the magnetic-inductive flowmeter for each measurement i. Here, the following holds true for mapping:

$$u = M\, v_z(x) \quad (3)$$

wherein u represents a vector that includes m voltage measurements.

In order to be able to solve the equation for $v_z(x)$, both sides have to be multiplied by $M^{-1}$. However, there is no inverse to the operator M. thus, a pseudo-inverse is used for reconstruction of the axial flow speed distribution $v_z(x)$:

$$\hat{v}_z(x) = M^+ u = M^*(MM^*)^{-1}u = M^*A^{-1}u = M^*\tilde{u} \quad (4)$$

thereby, $\hat{v}_z(x)$ is the reconstructed flow speed distribution and M* is the adjoint to M and $\tilde{u}$ is an auxiliary vector. The elements $a_{ij}$ of the (m×m)-matrix A can be calculated as follows:

$$a_{ij} = \iint_\Omega \rho(x)k_i(x)k_j(x)dxdy \quad (5)$$

The matrix A is included in the physical model of the magnetic-inductive flowmeter and, thus, only has to be calculated once. The individual elements $a_{ij}$ of the matrix are weighted with the weighting function ρ(x).

Finally, the following holds true for the reconstructed flow speed distribution $\hat{v}_z(x)$:

$$\hat{v}_z(x) = M^*A^{-1}u = \sum_i^m k_i(x)\tilde{u}_i \quad (6)$$

The DAR method allows for a weighting of individual components with a weighting function according to equation. With a known, supplied flow speed distribution, the deviation of the reconstructed flow speed distribution from the supplied flow speed distribution can be used for reducing the effects that go hand in hand with a high sensitivity in the direct surroundings of the electrodes. For this, an iterative method is chosen in order to adapt the weighting function, after calculating a flow speed distribution in a first step, for calculating a later (more exact) flow speed distribution in a second step. This can be done using equation:

$$\rho_{n+1}(x) = \rho_n(x) + b(\hat{v}_z(x) - v_z(x)) \quad (7)$$

n is thereby an iteration count for the respective iteration and b represents a feedback constant. The feedback constant can have a value between 0 and 1. The weighting function does not thereby influence the expected voltage u at the electrodes. The weighting function ρ(x), however, is used for weighting the characteristic functions $k_i(x)$, and thus, can compensate the inhomogeneities in the physical model. After several iterations, the reconstructed flow speed distribution converges at the value of the supplied flow speed distribution $v_z(x)$. If this doesn't happen, then a different value needs to be used for the feedback constant b. The feedback constant can, for example, be increased or decreased by a certain value after all n=N iterations (e.g., N>10, 20, 30, 40 or 50), and namely, until convergence occurs. In such a case, the weighting function $\rho_n(x)$ in equation has to be set back to zero.

The method can be carried out on a conventional computer chip, however, it can also be carried out on a microcontroller or a FPGA.

The invention is not limited to the described embodiments. In the scope of the invention, all described and/or illustrated features can be arbitrarily combined with one another.

What is claimed is:

1. A magnetic-inductive flowmeter, comprising:
   a measuring tube,
   at least one coil pair and
   at least one measuring electrode with an electrode head,
   wherein the measuring tube comprises an inflow section and an outflow section which are spaced to one another in an axial direction of the measuring tube,
   wherein the measuring tube has at least one opening on a circumferential wall thereof,
   wherein the electrode head of the at least one measuring electrode is arranged in the at least one opening,
   wherein the at least one coil pair is provided with a first coil and a second coil,
   wherein the first and second coil of the at least one coil pair are arranged offset with respect to one another in the axial direction of the measuring tube on the circumferential wall of the measuring tube,
   wherein the first and the second coil are arranged at least partially overlapping one another in a top view of a cross section through the measuring tube,
   wherein the at least one measuring electrode is arranged on a peripheral area of the circumferential wall of the measuring tube that is located in an axial direction of measuring tube between the first and the second coil of the at least one coil pair, and wherein the at least one coil pair and the at least on measuring electrode are arranged relative to each other for performing magnetic-induction flow measurements with the flowmeter.

2. The magnetic-inductive flowmeter according to claim 1, wherein the first and the second coil of the at least one coil pair are arranged offset to one another solely in the axial direction and/or that the first and the second coil of the at least one coil pair are arranged completely overlapping and/or congruent to one another in the top view of a cross section through the measuring tube.

3. The magnetic-inductive flowmeter according to claim 1, wherein the first and the second coil of the at least one coil pair are arranged radially with respect to the axial direction of the measuring tube and perpendicular to a direction of flow at the circumferential wall of the measuring tube.

4. The magnetic-inductive flowmeter according to claim 1, wherein the at least one measuring electrode is arranged radial to the axial direction of the measuring tube and perpendicular to the direction of flow at the circumferential wall of the measuring tube.

5. The magnetic-inductive flowmeter according to claim 1, wherein the at least one measuring electrode is as far away from the first coil of the at least one coil pair as from the second coil of the at least one coil pair.

6. The magnetic-inductive flowmeter according to claim 1, wherein the at least one measuring electrode, in a top view of a cross section through the measuring tube is arranged
   a) overlapping in respect to the first and second coil of the at least one coil pair; or
   b) offset in the peripheral direction in respect to the first and second coil of the at least one coil pair.

7. The magnetic-inductive flowmeter according to claim 1, wherein the first coil and the second coil of the at least one coil pair are connected electrically in series.

8. The magnetic-inductive flowmeter according to claim 1, wherein the first coil and the second coil of the at least one coil pair or all coil pairs are constructed identically to one another with respect to at least one of geometry, number of windings, winding cross section, and production material.

9. The magnetic-inductive flowmeter according to claim 1, wherein at least one the at least one coil pair comprises at least n coil pairs with n≥2, and wherein each of the at least n coil pairs has a first and a second coil, and the magnetic-inductive flowmeter comprises at least m measuring electrodes with m≥2.

10. The magnetic-inductive flowmeter according to claim 9, wherein the first coils of the at least n coil pairs are arranged in a first coil plane that runs perpendicular through the measuring tube, wherein the second coils of the at least n coil pairs are arranged in a second coil plane run perpendicular through the measuring tube, wherein the at least m measuring electrodes are arranged in a measuring plane that runs perpendicular through the measuring tube, and wherein the first coil plane, the second coil plane and the measuring plane are spaced from one another in the axial direction and are parallel to one another.

11. The magnetic-inductive flowmeter according to claim 10, wherein the measuring plane is arranged between the first coil plane and the second coil plane and is equally spaced from both coil planes.

12. The magnetic-inductive flowmeter according to claim 9, wherein the first and the second coils of the at least n coil pairs are symmetrically arranged with respect to the axial direction running through the measuring tube on the circumferential wall of the measuring tube.

13. The magnetic-inductive flowmeter according to claim 12, wherein there are as many coil pairs as measuring electrodes.

14. The magnetic-inductive flowmeter according to claim 13, further comprising a signal generator, a measuring unit and a control unit, wherein each of the at least one measuring electrodes is at least indirectly connected to an input of the measuring unit, wherein each of the at least one coil pairs is at least indirectly connected to an output of the signal generator and wherein the control unit is adapted for controlling the signal generator and the measuring unit so that the measuring unit detects a measuring voltage of at least the one measuring electrode at least one component of which is oriented perpendicular to the magnetic field.

15. The magnetic-inductive flowmeter according to claim 14, wherein the control unit is adapted for controlling the signal generator so that the respective first and second coils of two coil pairs arranged offset by 180° in a peripheral direction around the measuring tube generate a magnetic field which is directed in the same direction.

16. The magnetic-inductive flowmeter according to claim 14, wherein the control unit is adapted for controlling the signal generator so that the magnetic field permeates the measuring tube as a homogeneous field.

17. The magnetic-inductive flowmeter according to claim 16, wherein the control unit is adapted for controlling the signal generator (so that it excites the individual coil pairs spaced temporally (TDMA) or coded (CDMA) using the clocked constant field.

18. The magnetic-inductive flowmeter according to claim 16, wherein the control unit is adapted for controlling the signal generator so that it excites the individual coil pairs spaced temporally (TDMA) using a sinusoidal signal or simultaneously using different frequencies (FDMA).

19. The magnetic-inductive flowmeter according to claim 16, wherein the measuring unit comprises an I/Q demodulator for separating the measuring voltage from the interference signals.

20. The magnetic-inductive flowmeter according to claim 14, wherein the control unit is adapted for controlling the signal generator for exciting the first and the second coils of the at least one coil pair with either a clocked constant field or with a sinusoidal signal.

21. The magnetic-inductive flowmeter according to claim 9, wherein the first and the second coils of the at least n coil pairs are symmetrically arranged with respect to the axial direction running through the measuring tube in a respective opening of the circumferential wall of the measuring tube.

22. The magnetic-inductive flowmeter according to claim 21, wherein at least one of the first and the second coils of the at least n coil pairs are each arranged spaced relative to one another at α=360°/n on the circumferential wall of the measuring tube, and the at least m measuring electrodes are each arranged spaced to one another at α=360°/m on the circumferential wall of the measuring tube.

23. The magnetic-inductive flowmeter according to claim 1, wherein at least one the at least one coil pair comprises at least n coil pairs with n≥12, and wherein each of the at least n coil pairs has a first and a second coil, and the magnetic-inductive flowmeter comprises at least m measuring electrodes with m≥12.

24. A magnetic-inductive flowmeter, comprising:
   a measuring tube,
   at least one coil pair and
   at least one measuring electrode with an electrode head, wherein the measuring tube comprises an inflow section and an outflow section which are spaced to one another in an axial direction of the measuring tube, wherein the measuring tube has at least one opening on a circumferential wall thereof, wherein the electrode head of the at least one measuring electrode is arranged in the at least one opening, wherein the at least one coil pair is provided with a first coil and a second coil, wherein the first and second coil of the at least one coil pair are arranged offset with respect to one another in the axial direction of the measuring tube on the circumferential wall of the measuring tube, wherein the first and the second coil are arranged at least partially overlapping one another in a top view of a cross section through the measuring tube, and wherein the at least one measuring electrode is arranged on a peripheral area of the circumferential wall of the measuring tube that is located between the first and the second coil of the at least one coil pair, wherein the at least one coil pair comprises at least n coil pairs with n≥2, and wherein each of the at least n coil pairs has a first and a second coil, and the magnetic-inductive flowmeter comprises at least m measuring electrodes with m≥2, wherein the first and the second coil of each of the at least n coil pairs has a coil core and wherein the coil cores of all first coils of the at least n coil pairs are connected to one another on first ends thereof via a first yoke and wherein the coil cores of all second coils of the at least n coil pairs are connected to one another on their first ends via a second yoke.

25. A method for determining an axial flow speed distribution for a magnetic-inductive flowmeter comprising a measuring tube, at least one coil pair and at least one measuring electrode with an electrode head, wherein the measuring tube comprises an inflow section and an outflow section which are spaced to one another in an axial direction of the measuring tube, wherein the measuring tube has at least one opening on a circumferential wall thereof, wherein the electrode head of the at least one measuring electrode is arranged in the at least one opening, wherein the at least one coil pair is provided with a first coil and a second coil, wherein the first and second coil of the at least one coil pair are arranged offset with respect to one another in the axial direction of the measuring tube on the circumferential wall of the measuring tube, wherein the first and the second coil are arranged at least partially overlapping one another in a top view of a cross section through the measuring tube, and wherein the at least one measuring electrode is arranged on a peripheral area of the circumferential wall of the measuring tub that is located between the first and the second coil of the at least one coil pair, wherein the method comprises operating the flowmeter using a DAR method using a weighting function that contains an iterative method.

26. Method for determining an axial flow speed distribution according to claim 25, wherein the weighting function forms a difference between a reconstructed flow speed distribution and a supplied flow speed distribution.

27. Method for determining an axial flow speed distribution according to claim 25, wherein the weighting function is constructed according to the following formula:

$$\rho_{G+1}(x)=\rho_G(x)+b(\hat{v}_z(x)-v_z(x)),$$

wherein n gives the respective iteration, b is a feedback constant, $\hat{v}_z(x)$ shows the reconstructed flow speed distribution and $v_z(x)$ gives the supplied flow speed distribution.

* * * * *